United States Patent
Belcastro (12)

(10) Patent No.: US 6,269,968 B1
(45) Date of Patent: Aug. 7, 2001

(54) VALVE ARRANGEMENT FOR AN AUTOMATICALLY SEALING CUP

(75) Inventor: Domenic Belcastro, Fraser, MI (US)

(73) Assignee: Niko Products, Inc., Fraser, MI (US)

( * ) Notice: Subject to any disclaimer, the term of this patent is extended or adjusted under 35 U.S.C. 154(b) by 0 days.

(21) Appl. No.: 09/442,541

(22) Filed: Nov. 18, 1999

(51) Int. Cl.[7] ............................. A47G 19/22; B65D 51/16
(52) U.S. Cl. ............. 220/714; 220/203.18; 220/203.19; 220/717; 220/719
(58) Field of Search .................... 220/714, 703, 220/711, 713, 715, 716, 717, 719, 202, 203.01, 203.02, 203.11, 203.13, 203.14–203.19, 203.23, 203.24, 203.28, 212, 231, 253, 254, 256, 360, 361, 367.1, 373, 374; 222/481.5; 137/198, 173; 215/11.4, 11.5

(56) References Cited

U.S. PATENT DOCUMENTS

| | | | | |
|---|---|---|---|---|
| 3,974,936 | * | 8/1976 | Gerdes | 220/203.26 X |
| 4,379,470 | * | 4/1983 | Reutter | 220/203.02 X |
| 4,420,015 | * | 12/1983 | Blaser | 220/203.18 X |
| 5,121,840 | * | 6/1992 | Schram | 220/203.11 X |
| 5,388,615 | * | 2/1995 | Edlund et al. | 220/203.18 |
| 5,702,019 | * | 12/1997 | Girmard | 215/301 |
| 5,706,973 | * | 1/1998 | Robbins, III et al. | 220/714 |
| 5,890,620 | * | 4/1999 | Belcastro | 220/714 |

* cited by examiner

Primary Examiner—Allan N. Shoap
Assistant Examiner—Niki M. Eloshway
(74) Attorney, Agent, or Firm—Artz & Artz, P.C.

(57) ABSTRACT

A self-sealing drinking container includes a cup body having a hollow interior for holding and dispensing a liquid, and a lid assembly which fits sealingly on the cup body. The lid assembly has an inlet passage with an inlet value in communication with an outlet value in communication therewith, each of the values including a resilient flexible diaphragm member. Each of the inlet and outlet valves includes a cage having an open top and an open bottom to allow fluid passage therethrough, the cage having a seat formed therein for receiving a diaphragm member. The diaphragm member is located seatably into the seat so as to selectively seal thereagainst and thereby prevent fluid flow therepast. A locator post in each cage is secured to the diaphragm member thereof to ensure its sealing. A predetermined level of fluid pressure differential across each diaphragm member courses, respectively, the diaphragm members to concavely bend away from their respective seat and thereby allow fluid flow through the valves. However, below the respective predetermined levels of fluid pressure differential, the diaphragm members sealinglingly abut their respective seats, thereby sealing the cup.

17 Claims, 3 Drawing Sheets

FIG. 1
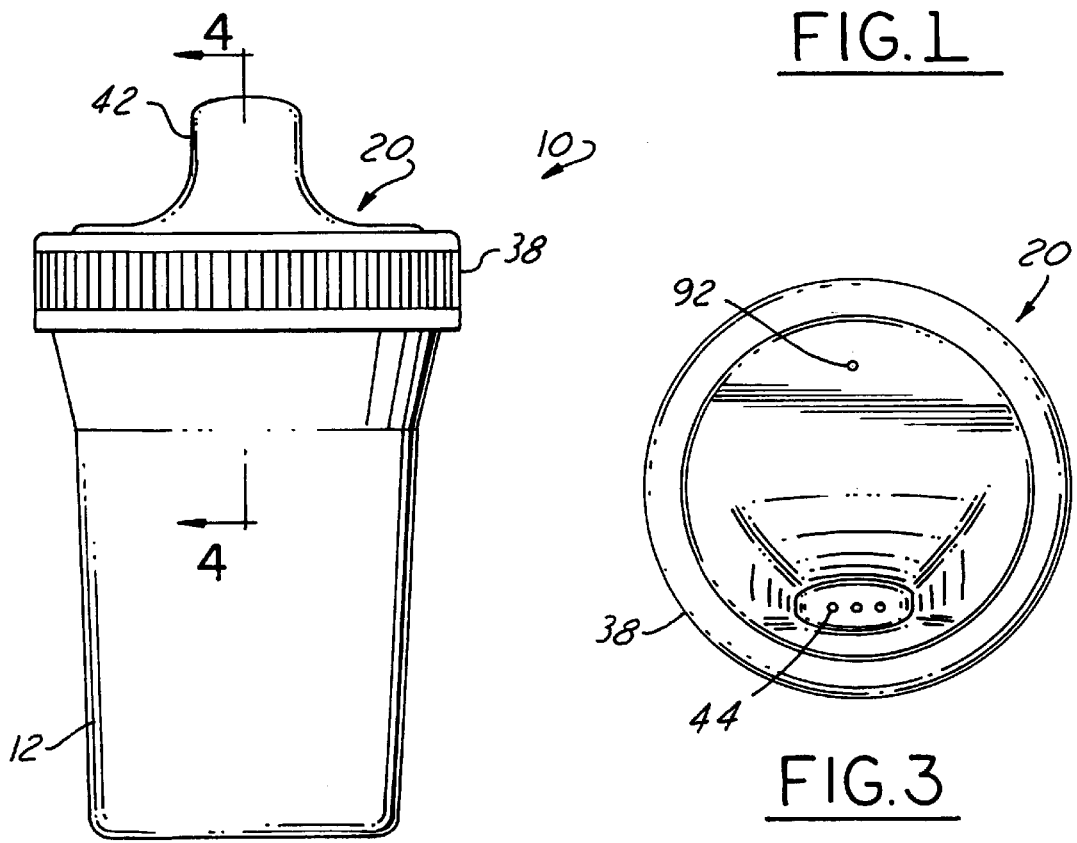
FIG. 2
FIG. 3

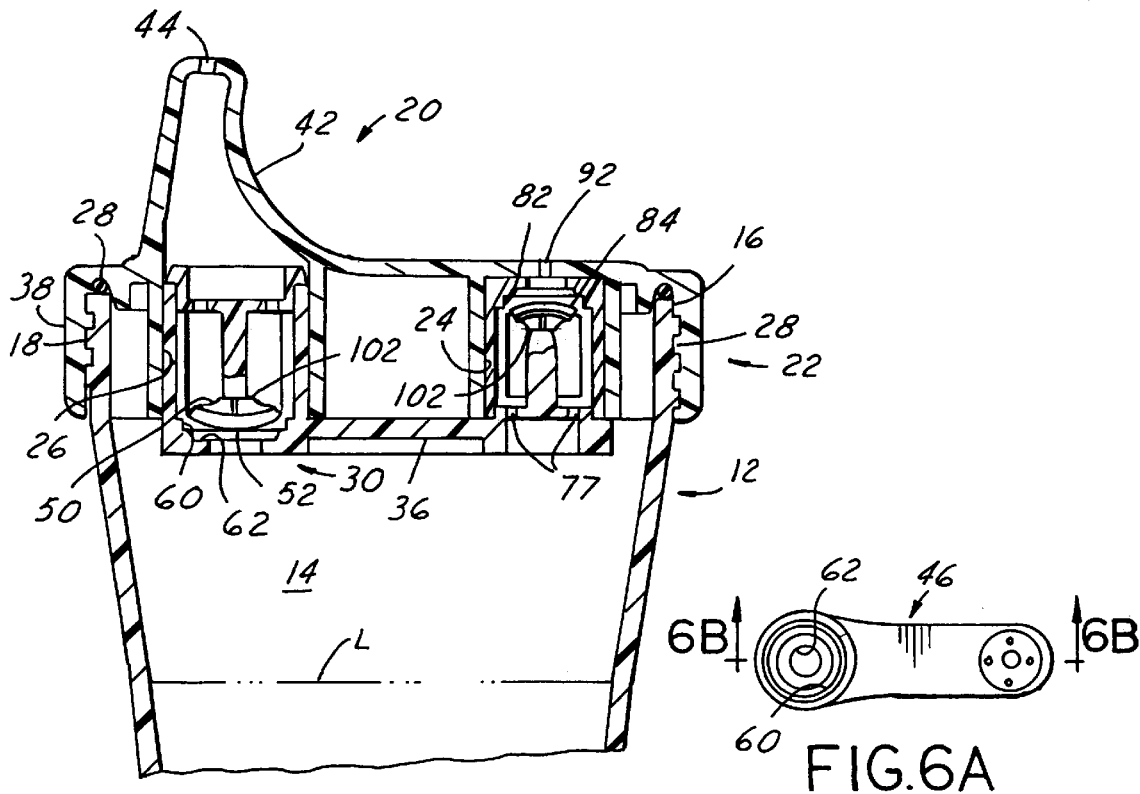
FIG.4
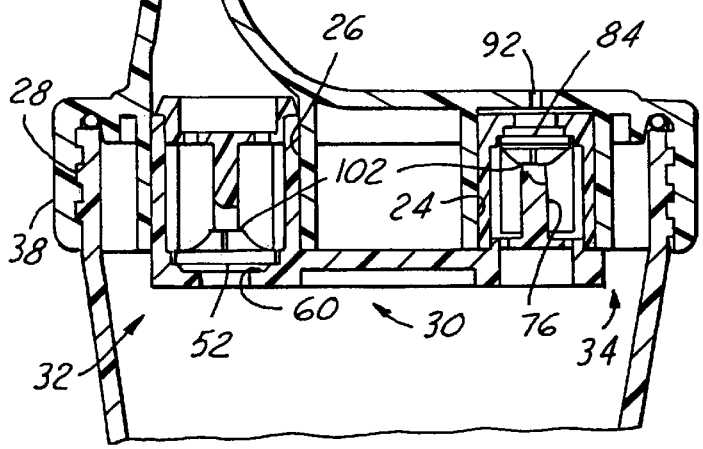
FIG.5
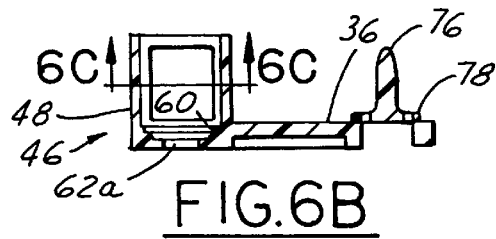
FIG.6A
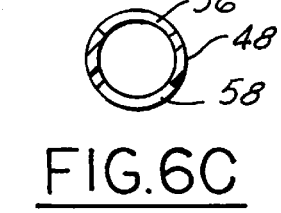
FIG.6B
FIG.6C
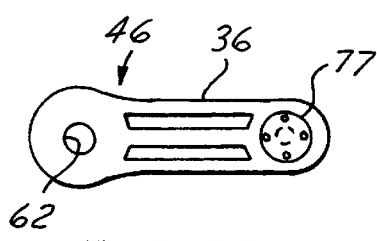
FIG.6D

VALVE ARRANGEMENT FOR AN AUTOMATICALLY SEALING CUP

TECHNICAL FIELD

The present invention relates to a sealable cup for holding an d dispensing drinkable fluids. More particularly, the present invention relates to an improved arrangement for a sealable cup which seals automatically to prevent spillage of fluids therefrom when the cup is not in use.

BACKGROUND ART

Cups are widely used for drinking liquids. These cups usually have an open mouth. Travel mugs and other spill-resistant cups that come with lids or caps are also known for covering the mouth to resist spillage of the cup contents. In addition, sports bottles are often provided with a screwed-on lid having a built-in straw, and a cap for sealing the end of the straw. Some of these sports bottles also have a manually operated pop-up vent which is sealed when pushed down and open when pushed up. These sports bottles still suffer from the problem that they will empty their contents if the bottle is tipped sideways, unless, fortuitously, the straw had been previously manually capped, the vent had been previously manually pushed down, and the fit between the aperture and the lid and the straw was truly sealing.

One type of commercially available cup for use by anyone, and particularly well suited for small children, includes a cup body and a lid which fits sealingly onto the cup body, with the drinking spout incorporated into the lid. Some self-sealing spill resistant cups are known and commercially available. These spill resistant cups all suffer from a variety of disadvantages.

One example of such a cup is disclosed in U.S. Pat. No. 5,079,013 to Belanger. Belanger discloses a dripless liquid container for training and feeding a young person to drink. The container of Belanger has a cup-shaped liquid housing and a lid which fits sealingly on the housing. The lid has a spout for drinking out of, with an outlet formed in the lid and in fluid communication with the spout. A spring-loaded self-sealing outlet valve is provided in fluid communication with the outlet. The lid also has an air inlet formed therein which admits air to replace the volume of fluid removed from the housing, with a spring-loaded self-sealing air rim and control valve in communication with the air inlet. The liquid container disclosed in Belanger because of the inclusion of the spring loaded valve is complicated to manufacture and assemble. The configuration of the valve also makes it difficult to clean and thus maintain sanitary conditions. Further, the cup disclosed in Belanger is relatively expensive.

Another example of a spill-resistant cup is disclosed in U.S. Pat. No. 5,890,620 to Belcastro. Belcastro improves on the liquid container disclosed in Belanger by eliminating the use of spring-loaded valves and utilizing self-sealing inlet and outlet valves which include disc shaped flexibly resilient diaphragm members. However, the drinking container disclosed in Belcastro utilizes a valve comprised of a plurality of separate and discreet parts in order to provide sufficient force on the diaphragm members to keep them from being open at all times. The use of these multiple parts provides a number of disadvantages, including increasing the cost of manufacture and assembly, as well as the time. Further, the more parts that are present, the longer a cup typically takes to clean or sanitize. Moreover, some of the valve parts are free-floating and not rigidly secured therein. If these parts move, they can affect the performance of the cup, including causing leakage, and potentially raising safety concerns.

SUMMARY OF THE INVENTION

It is an object of the present invention to provide an automatically sealing cup for use by infants and small children having improved valve members which particularly provide sanitary operation and are inexpensive and easily maintained.

It is another object of the present invention to provide an automatically sealing cup having an inlet valve and an outlet valve wherein the inlet and outlet valves operate on a flexibly resilient diaphragm principle.

It is still another object of the present invention to provide an automatically sealing cup having inlet and outlet valves that are constructed of less parts than prior valve arrangements.

It is a further object of the present invention to provide an automatically sealing cup having inlet and outlet valves that cannot become displaced with respect to the cup to ensure proper operation and no leakage.

It is yet another object of the present invention to provide an automatically sealing cup having a valve assembly that is smaller than prior valve assemblies.

In accordance with the above and other objects of the present invention, an improved self-sealing drinking container is provided. The self-sealing drinking container includes a cup body having a hollow interior for holding and dispensing a liquid, and a lid assembly which fits sealingly onto the cup body. The lid assembly has an inlet passage with an inlet valve in communication therewith, and also has an outlet passage with an outlet valve in communication therewith. Each of the inlet and outlet valves includes a cage having an open top and an open bottom to allow fluid to pass therethrough. Each of the inlet and outlet valves includes a locating member that extends toward a respective valve seat. Each of the locating members is secured to a flexible diaphragm member which is positioned in the respective valve seat. Each diaphragm member has a plurality of stiffening ribs that extend generally from an outer periphery of each flexible diaphragm member inwardly toward each respective locating member.

Other objects, features, advantages, and benefits of the present invention will become apparent from a review of the specification when read in conjunction with the accompanying drawings.

BRIEF DESCRIPTION OF THE DRAWINGS

FIG. 1 is a perspective view of a young person drinking from an automatically sealing cup in accordance with a referred embodiment of the present invention;

FIG. 2 is a side plan view of an automatically sealing cup in accordance with a preferred embodiment of the present invention;

FIG. 3 is a top plan view of an automatically sealing cup in accordance with a preferred embodiment of the present invention;

FIG. 4 is a partially broken away cross-sectional side view of the automatically sealing cup in accordance with a preferred embodiment of the present invention, taken along the line 4—4 in FIG. 2, illustrating a valve in a fluid passage state;

FIG. 5 is a partially broken away cross-sectional view similar to FIG. 4, but showing the diaphragm members in a configuration such that fluid cannot flow from the cup;

FIG. 6A is a top plan view of a compound valve member in accordance with a preferred embodiment of the present invention;

FIG. 6B is a cross-sectional view of the compound valve member taken along the line 6B—6B of FIG. 6A;

FIG. 6C is a cross-sectional view of the compound valve member taken along the line 6C—6C in FIG. 6B.

FIG. 6D is a bottom plan view of the compound valve member in accordance with a preferred embodiment of the present invention;

DETAILED DESCRIPTION OF THE PREFERRED EMBODIMENT

Figure 7:
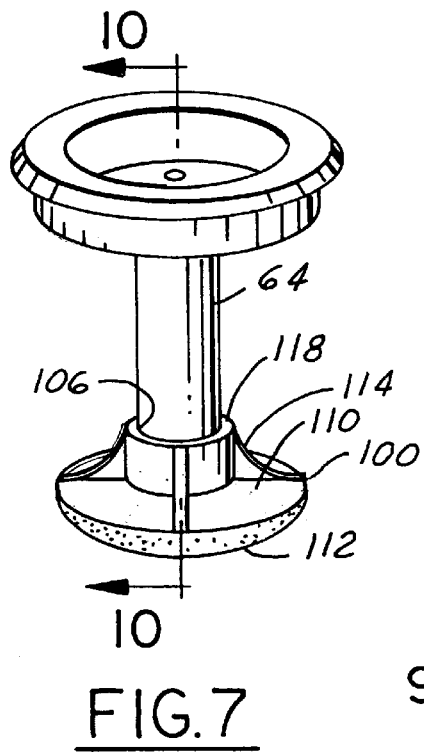
FIG. 7 is a perspective view of a diaphragm member with reinforcing ribs in accordance with a preferred embodiment of the present invention.

Referring now to the Drawings, an automatically sealing cup, for use by anyone, including for example an infant or young child, is shown generally at 10. The cup 10 includes a cup body 12 having a hollow interior 14 (see FIG. 4) for holding a drinkable liquid L such as. e.g., water, milk or juice therein. The cup body 12 is preferably formed in the shape of a generally tapered cylinder, and is preferably formed from a durable plastic material, such as polypropylene. The cup body 12 includes an upper section 16 having threads 18 formed circumferentially therearound to threadably receive a lid assembly 20 thereon.

The lid assembly 20, in accordance with a preferred embodiment of the present invention, is a composite assembly made up of several component parts which will be briefly listed here, and which will be described in further detail hereinbelow, along with the structural interrelationship thereof.

The lid assembly 20 includes a lid casing 22 which serves as a main body thereof (see FIGS. 4 and 5). The lid casing 22 has a substantially cylindrical inlet passage 24 and a substantially cylindrical outlet passage 26 formed integrally therein on the lower surface thereof. The lid assembly 20 preferably also includes an annular rubber or elastomeric gasket 28 fitted into the lid casing 22 for compressibly contacting the upper section 16 of the cup body 12 when the lid assembly 20 is threadably installed thereon, to thereby form a fluid-tight seal therebetween (see FIGS. 4 and 5).

The lid assembly 20 further includes a compound valve assembly 30 which fits into the underside of the lid casing 22. The compound valve assembly 30 includes an outlet valve 32, received by the outlet passage 26, and an inlet valve 34 received by the inlet passage 24. The outlet and inlet valves 32, 34 are preferably interconnected by a connector bar 36 whereby both valves can be installed and removed from the lid casing 22 simultaneously. Advantageously, according to the present invention, each of the outlet and inlet valves 32, 34 operate on a resilient diaphragm principle, which will be detailed hereinbelow.

The lid assembly 20 includes a lid casing 22 which serves as a main body thereof. As mentioned, the lid casing 22 is preferably formed from a durable plastic material such as polyethylene or polypropylene. The lid casing 22 has a substantially cylindrical inlet passage 24 and a substantially cylindrical outlet passage 26 formed integrally therein on the lower surface thereof. The lid casing 22 also includes a cylindrical collar 38 extending therearound. The lid casing 22 has internal threads formed inside the cylindrical collar 38 to threadably engage and intermesh with the external threads 18 of the cup body 12 for screwing the lid assembly 20 thereon. Preferably, the cylindrical collar 38 is knurled on an outer surface thereof to provide gripping as an aid to threading the lid casing 22 onto and off from the cup body 12. The lid casing 22 further includes an integrally molded spout 42, having one or more outlet holes 44 formed therethrough at the uppermost extension thereof. to allow liquid to pass outwardly therefrom. The lid casing 22 further has an orifice 92 located remote from the spout 42 for allowing air to enter therethrough into the cup.

As shown in FIGS. 4 and 5, the compound valve assembly 30 forms a subassembly of, and a part of, the lid assembly 20. The compound valve assembly 30, as previously noted, includes an outlet valve 32 and an inlet valve 34, which are interconnected by the connector bar 36. The outlet and inlet valves 32, 34 are constructed substantially similarly to one another, but are oriented in a mutually inverted relationship because of the different directions of flow therethrough.

As illustrated in FIGS. 6A through 6C, a compound valve member 46 is a part of the compound valve assembly 30, and includes parts of both the inlet and outlet valves 34, 32. The connector bar 36, which connects the outlet valve 32 to the inlet valve 34, is also part of the compound valve member 46.

The compound valve member 46 includes a generally barrel-shaped first cage member 48 which is open at the top and bottom thereof. The first cage member 48 provides a housing for the outlet valve 32. As is discussed in more detail below, the outlet valve 32 is comprised of a locating member 50 and a diaphragm member 52 (see FIGS. 7 through 10). The first cage member 48 of the compound valve member 46 is shown on the left thereof in FIGS. 4, 5, and 6B, and fits snugly into the outlet passage 26 of the lid casing 22, as shown in FIGS. 4 and 5. The first cage member 48 may be constructed to friction fit or snap into the outlet passage 26, or may be glued or welded therein or otherwise affixed thereto. The first cage member 48 of the compound valve member 46, preferably, has a pair of optional openings 56, 58 formed in the sides thereof to promote fluid flow therethrough (see FIG. 6C). The first cage member 48 also has a circular outlet seat 60 formed inside the bottom thereof, to receive the first diaphragm member 52 therein. The first cage member 48 further includes an opening 62a defined by an annular internal flange 62. The internal flange 62 extends radially inwardly from, and below, the outlet seat 60 to prevent the first diaphragm member 52 from moving downwardly therepast.

Figure 8:
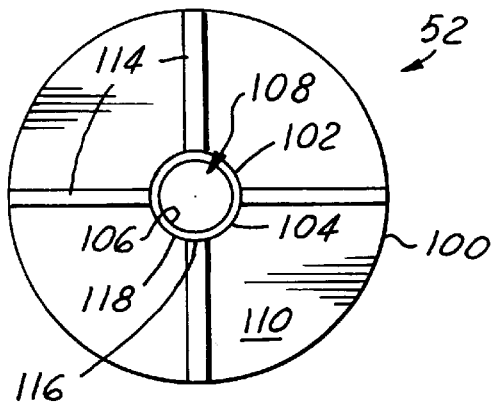
FIG. 8 is a top view of a diaphragm member with reinforcing ribs in accordance with a preferred embodiment of the present invention.
Figure 10:
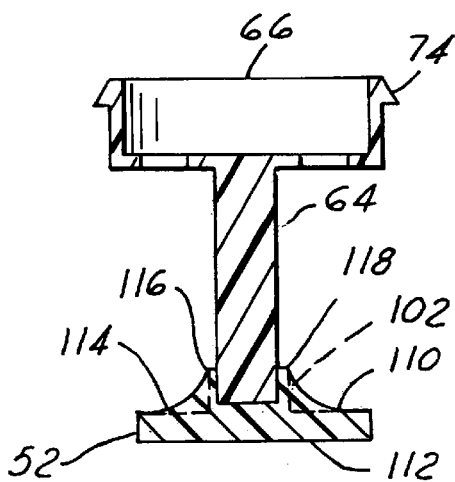
FIG. 10 is a side view of a locating member mated with a diaphragm member in accordance with a preferred embodiment of the present invention.

As shown in FIGS. 7, 8 and 10, the first diaphragm member 52 is generally circular in shape and has an outer periphery 100 and a central hub portion 102, having an outer surface 104 and an inner surface 106. The inner surface 106 of the hub portion 102 defines a bore 108. The first diaphragm member 52 has a valve seat engaging surface 110 and an opposing non-valve seat engaging surface 112. The hub portion 102 preferably extends generally upward and generally perpendicular to the non-valve seat engaging surface 112. The first diaphragm member 52 also has a plurality of stiffening ribs 114 formed on the non-valve seat engaging surface 112. The stiffening ribs 114 assist in keeping the first diaphragm member 52 flatly abutting the outlet seat 60 in the absence of a predetermined level of differential fluid pressure acting thereon.

In the preferred embodiment, four stiffening ribs 114 are formed on the first diaphragm member 52 such that they are uniformly disposed around the central hub portion 102. The stiffening ribs 114 preferably extend from the outer periphery 100 into contact with the outer surface 104 of the central hub portion 102. Additionally, the stiffening ribs 114 preferably gradually increase in height as they extend from the outer periphery 100 to the hub portion 102. As shown, the inner portion 116 of each of the ribs 114 preferably terminates at the top portion 118 of the central hub portion 102. The stiffening ribs 114 may take on a variety of configurations, but are preferably formed integral with the first diaphragm member 52 such that they form a single uniform piece. Additionally, there may be more or less than four ribs and they can be non-uniformly spaced about the periphery of the central bore. The first diaphragm member 52 is preferably formed from a silicone elastomer, and cooperates with the outlet seat 60 to form a selectively fluid-tight seal.

Figure 9A:
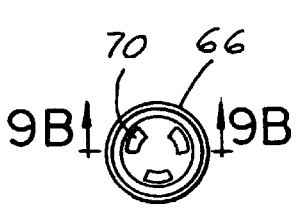
FIG. 9A is a top plan view of a locating member of a lid assembly in accordance with a preferred embodiment of the present invention.
Figure 9B:
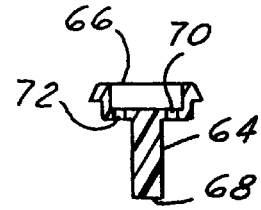
FIG. 9B is a cross-sectional view of a locating member in accordance with a preferred embodiment of the present invention.

The locating member 50 fits into the first cage member 48 of the compound valve member 46, as part of the outlet valve 32. The locating member 50 is generally T-shaped in cross-section, as shown in FIG. 9B, having a first locator post 64 extending downwardly from a perforated circular head 66. The first locator post 64 centrally terminates in a small cylindrical projection 68, at the lowermost end thereof, which fits engagingly into the central hub portion 102 in the first flexible diaphragm member 52 to prevent the first flexible diaphragm members 52 from becoming unmated with the first locator post 64. The first diaphragm member 52 is preferably press fit onto the first locator post 64. Additionally, because of the configuration of diaphragm member 52 and its attachment to the first locator post 64, the first cage member 48 can be constructed relatively small, which provides material cost savings as well as a size decrease. The head 66 of the locating member 50 is preferably generally circular in shape, and has one or more apertures 70 formed therein to allow fluid flow therethrough.

The head 58 includes a right angled shoulder 72 on the side thereof which is dimensioned to fit inside the top of the first cage member 48 of the compound valve member 46, as shown in FIGS. 4 and 5. A circular external flange 74 extends horizontally outwardly above the shoulder 72, at the top of the head 66 of the locating member 50. The circular external flange 74 acts as a stop to limit the extent to which the locating member can travel downwardly in the first cage member 48. The locating member 50 may be constructed to snap in place in the first cage member 48, may fit therein by friction, or may be glued therein. However, it is preferred that the circular external flange 74 and the shoulder 72 be sonic welded to the first cage member 48.

The first cage member 48, the locating member 50, and the first diaphragm member 52, together make up the outlet valve 32 according to the present invention and are thus preferably provided as a single unitary piece, together with the inlet valve 34, as discussed in more detail below. By securing these parts to and within the cage member 48, there are no floating or unattached parts as in prior valve configurations. This configuration minimizes any safety issues as the valve has no unsecured parts that can become dislodged. Additionally, because the first diaphragm member 52 is secured to the locating member 50, which is secured to the first cage member 48, the need for any other support pieces is eliminated, which decreases the manufacturing time and cost as well as assembly time and cost. Moreover, the locating member 50 and the first diaphragm member 52 can be assembled as a single unit to the first cage member 48, which decreases assembly time over prior valve configurations.

The compound valve member 46 also includes a second locator post 76 which is shown on the right in FIG. 6B, and which forms a part of the inlet valve 34. The second locator post 76 is connected to the first cage member 48 by the integrally formed connector bar 36, and extends upwardly therefrom. A raised circular boss 78 extends upwardly on the compound valve member 46, above the level of the connector bar 36 and at the base of the second locator post 76, to provide an aligning surface to line up the second locator post 76 with the inside of a second cage member 80 in assembling the inlet valve 34.

Figure 11A:
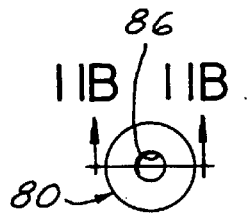
FIG. 11A is a top plan view of a cage member which is another component of a lid assembly in accordance with a preferred embodiment of the present invention.
Figure 11B:
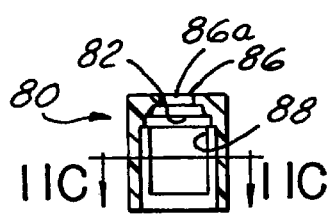
FIG. 11B is a cross-sectional view of the cage member of FIG. 11A taken along the line 11B—11B.
Figure 12:
FIG. 12 is a bottom view of a diaphragm member in accordance with a preferred embodiment of the present invention.
Figure 11C:
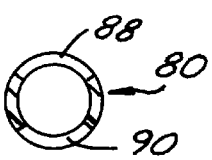
FIG. 11C is a cross-sectional end view of the cage member of FIG. 11B taken along the line 11C—11C.

The inlet valve 34 also includes the second cage member 80, which is shown separately in FIGS. 11A, 11B and 11C. The second cage member 80 is similar to, and shares a similar function with, the first cage member 48 of the compound valve member 46, but is a separate piece which is distinguishable therefrom. The first cage member 48 of the compound valve member 46 forms a part of the outlet valve 32, while by contrast, the second cage member 80 forms a part of the inlet valve 34 hereof.

The second cage member 80 has a generally hollow cylindrical barrel shape which is open at the top and bottom thereof to allow fluid flow therethrough. The second cage member 80 has a circular inlet seat 82 formed therein, at the top thereof, to receive a second diaphragm member 84 therein. The second diaphragm member 84, like the first diaphragm member 52, has a flexibly resilient disc-shape, with a plurality of stiffening ribs 114, which are preferably formed of a silicone elastomer and integral with the second diaphragm member 84. The second diaphragm member 84 is identical in all respects to the first diaphragm member 52, except that it is inverted. The second cage member 80 further has an opening 86a defined by an annular internal flange 86 extending inwardly therein above the inlet seat 82, to retain the second diaphragm member 84 therebelow. The second diaphragm member 84 seats into the inlet seat 82 so as to provide a selectively fluid-tight seal therebetween. The second cage member 80 is dimensioned to fit snugly into the inlet passage 24 of the lid casing 22. It is preferred that the second cage member 80 is attached to the connector bar 36 by sonic welding or other suitable attachment means. Preferably, the second cage member 80 has a pair of optional openings 88, 90 formed in the sides thereof to promote fluid flow therethrough.

The second cage member 80, the second diaphragm member 84, and the second locator post 76 of the compound valve member 46, together, make up the inlet valve 34 in accordance with the present invention and are thus preferably provided as a singly unitary piece along with the outlet valve 32, as discussed above. By securing these parts to and within the cage member 80, there are no floating or unattached parts, which minimizes any safety issues and prevents leakage that may result for any displacement of the diaphragm member 84. Additionally, the second diaphragm member 84 is secured to the locator post 76, by press-fitting the second diaphragm member 84 thereon. Further, the boss 78 of the locator post 76 is preferably sonic welded to the second cage member 80 after the second diaphragm member 84 has been secured to the locator post 76. This configuration results in the usage of minimal space and allows for the valve member 46 to be made smaller than prior valve arrangements. Further, the inclusion of the stiffening ribs 114 eliminates the need for any other support pieces, which decreases the manufacturing time and cost as well as the assembly time and cost.

In assembling the lid assembly 20 according to a preferred embodiment of the present invention, the first diaphragm member 52 is mated with the first locator post 64 by engaging the lowermost end of the first locator post 64 into the central hub portion 102 of the first diaphragm member 52. The first diaphragm member 52 is then placed into the outlet seat 60 formed in the first cage member 48 of the compound valve member 46 with the circular external flange 74 abutting the first cage member 48. The circular external flange 74 is then secured to the cage member 48. As the first locator post 64 extends substantially to the outlet seat 60, it presses the first diaphragm member 52 into communication therewith and thereby prevents the first diaphragm member 52 from becoming displaced from the outlet seat 60. Further, the first diaphragm member 52 cannot become displaced from the first locator post 64.

The second diaphragm member 84 is then secured to the second locator post 76 by placing the uppermost end of the second locator post 76 into a raised central hub portion 102 formed in the second diaphragm member 84. The second cage member 84 is then placed onto the raised boss 78 of the compound valve member 46, so that the second diaphragm member 84 contacts the inlet seat 82. The second cage member 84 is then secured to the compound valve member 46. As the second locator post 76 extends substantially toward the inlet seat 82, it presses the second diaphragm member 84 into communication therewith and thereby prevents the second diaphragm member from becoming displaced from the inlet seat 76. Further, the second diaphragm member 84 cannot become displaced from the second locator post 76.

The assembly of the compound valve assembly 30 is then completed such that the compound valve assembly 30 is a separate single structure. The valve assembly 30 can then be installed into the lid casing 22, with the outlet valve 32 thereof sealingly fitting into the outlet passage 26 of the lid casing, and the inlet valve 34 thereof sealingly fitting into the inlet passage 24. As previously discussed, the compound valve assembly 30 is attached to the lid casing 22 by any suitable attachment means.

In operation, each of the first and second diaphragm members 52, 84 are seated into their respective outlet and inlet seats 60, 82 and located thereat through their respective attachment to the first and second locator posts 64, 76, respectively. In this configuration, the first and second diaphragm members 52, 84 sealingly abut their respective outlet and inlet seats 60, 82. However, when a predetermined level of fluid pressure differential across the first diaphragm member 52 occurs, then the first diaphragm member 52 concavely bends away from its outlet seat 60, as the first locator post 64 prevents the central hub portion 102 of the first diaphragm member 52 from flexing. Accordingly, fluid is enabled to flow therethrough out of the cup. As fluid dispenses out of the cup, the air pressure inside the cup reduces below atmospheric pressure. Accordingly, a second predetermined level of fluid pressure differential across the second diaphragm member 84 occurs. As a result, the second diaphragm member 84 concavely bends away from the inlet seat 82, as the second locator post 76 prevents the central hub portion 102 of the second diaphragm member 84 from flexing. Accordingly, air is enabled to flow therethrough into the cup.

The predetermined level of pressure differential across the inlet valve 34 to cause the second diaphragm member 84 to unseat may be small, in that the hydraulic pressure exerted by liquid in the cup is in a direction to seat the second diaphragm member 84 on its inlet seat 82 and is applied at the low pressure side of the pressure differential across the second diaphragm member 84. In contradistinction, in that the hydraulic pressure exerted by liquid in the cup is in a direction to unseat the first diaphragm member 52 from its outlet seat 60 and is applied at the high pressure side of the pressure differential across the first diaphragm member 52, the predetermined level of pressure differential across the outlet valve 32 is preferably at least equal to the anticipated maximum hydraulic pressure of the liquid in the cup acting on the first diaphragm member 52 when the cup is in an inverted orientation, and further is at a value which is easily and comfortably attained by a person sucking on the spout with his or her mouth during the act of drinking. The stiffening ribs 114 of each of the first and second diaphragm member 52, 84 act to press the diaphragm members into their respective valve seats 60, 80 when no pressure is being applied.

As illustrated in FIGS. 1 and 4, when a person applies suction to the spout 42, which communicates with the outlet passage 26 through the apertures 70 in the locating member 50, the applied suction concavely flexes and the first diaphragm member 52 away from the outlet seat 60, and permits liquid L from the interior 14 of the cup 10 to flow past the first diaphragm member and out of the spout 42. At the same time, lowered pressure in the interior of the cup 10 causes air outside of the cup 10 to press inwardly on the second diaphragm member 84 in the inlet passage 24, concavely flexing the second diaphragm member 84 away from the inlet seat 82, and allowing air to pass through an orifice 92 formed in the top of the lid casing 22 above the inlet passage 24. This air then passes through the second cage member 80, via a series of perforations 77 formed through the raised boss 78 of the compound valve member 46 at the base of the locating post 76, and then passes into the hollow interior 14 of the cup body 12 to equalize pressure inside and outside the cup 10.

When drinking stops, as illustrated in FIG. 5, the natural resiliency of the flexible first diaphragm member 52, as well as the second diaphragm member 84, through the inclusion of the stiffening ribs 114, bias back into their seated seating positions. The first diaphragm member 52 fits sealingly into the outlet seat 60 formed in the first cage member 48 of the outlet valve 32, to prevent spillage from the cup through the outlet passage 26, and the second diaphragm member 84 fits sealingly into the inlet seat 82 formed in the cage member 80 of the inlet valve 34, to prevent spillage from the cup 10 at the inlet passage 24.

Although the present invention has been described herein with respect to a preferred embodiment thereof. the foregoing description is intended to be illustrative. and not restrictive. Those skilled in the art will realize that many modifications of the preferred embodiment could be made which would be operable. All such modifications which are within the scope of the appended claims are intended to be within the scope and spirit of the present invention.

What is claimed is:

1. A valve assembly for a self-sealing drinking container, comprising:
    an outlet cage member having an open top portion and an outlet valve seat formed at its bottom portion;
    an inlet cage member having an open bottom portion and an inlet valve seat formed at its top portion;
    a first locator member having a head portion, a post portion, and a tip portion;
    a first diaphragm member secured on said tip portion of said first locator member;
    said first diaphragm member having a plurality of ribs formed thereon, said first diaphragm member being disposed in said outlet valve seat;
    a second locator member having a head portion, a post portion, and a tip portion;
    a second locator diaphragm member secured onto said tip portion of said second locator member;
    said second diaphragm member having a plurality of ribs formed thereon, said second diaphragm member being disposed in said inlet valve seat; and
    a locator bar connecting said inlet cage member with said outlet cage member.

2. The valve assembly of claim 1, wherein said head portion of said first locator member is sonic welded to an upper portion of said outlet cage member.

3. The valve assembly of claim 2, wherein said head portion of said second locator member is sonic welded to a lower portion of said inlet cage member.

4. The valve assembly of claim 3, wherein said first diaphragm member has a central hub portion extending generally upward from said outlet valve seat, said central hub portion having a bore formed therein for receipt of said tip portion of said first locator member therein.

5. The valve assembly of claim 4, wherein said plurality of ribs on first diaphragm member are uniformly disposed about said central hub portion.

6. The valve assembly of claim 5, wherein each of said plurality of ribs extend from a periphery of said first diaphragm member inwardly and terminate at said central hub portion.

7. The valve assembly of claim 6, wherein each of said plurality of ribs increase in height as they extend inwardly toward said central hub portion.

8. The valve assembly of claim 1, wherein said first diaphragm member is press fit onto said first locator member.

9. A self-sealing drinking container, comprising:
    a cup body hollow interior for holding and dispensing a liquid;
    a lid assembly sealingly engageable with said cup body, said lid assembly having an inlet and an outlet;
    an outlet valve located in said outlet for selectively sealing said outlet, said outlet valve comprising;
        an outlet seat;
        a flexibly resilient first diaphragm member seated at said outlet seat, said first diaphragm member having a central hub portion raised from a surface opposite said outlet seat;
        a first locator having an upper portion and a lower portion, said lower portion being disposed in said raised central hub portion of said first diaphragm member; and
    an inlet valve located in said inlet for selectively sealing said outlet, said outlet valve comprising;
        an inlet seat;
        a flexibly resilient second diaphragm member seated at said inlet seat, said second diaphragm member having a central hub portion raised from a surface opposite said inlet seat;
        a second locator having an upper portion and a lower portion, said upper portion being disposed in said raised central hub portion of said second diaphragm member;
    wherein said first diaphragm member is sealingly seated at said outlet seat below a first predetermined level of fluid pressure differential applied thereacross; and
    wherein said second diaphragm member is sealingly seated at said inlet seat below a second predetermined level of fluid pressure differential applied thereacross; and
    wherein said first diaphragm member resiliently bends so as to unseal with respect to said outlet seat above said first predetermined fluid pressure differential applied thereacross, and wherein said second diaphragm member resiliently bends so as to unseal with respect to said inlet seat above said second predetermined level of fluid differential pressure applied thereacross.

10. The drinking container of claim 9, wherein said outlet valve regulates liquid flow out of said cup body, and wherein said inlet valve regulates air flow into said cup body responsive to said liquid flow out of said cup body.

11. The drinking container of claim 10, wherein said inlet and outlet valves further comprise:
    a first cage member located in said outlet, said outlet seat being formed in said first cage member; and
    a second cage member located in said inlet, said inlet seat being formed in said second cage member.

12. The drinking container of claim 11, wherein said first and second cage members are mutually connected together to thereby form a compound valve assembly which sealingly interferes with said lid assembly.

13. The drinking container of claim 11, wherein said upper portion of said first locator is sonic welded to said first cage member to secure said outlet valve.

14. The drinking container of claim 11, wherein said lower portion of said second locator is sonic welded to said second cage member to secure said outlet valve.

15. The drinking container of claim 9, wherein a plurality of ribs are formed on said surface opposite said outlet seat of said first diaphragm member.

16. The drinking container of claim 15, wherein said plurality of ribs are uniformly spaced about said central hub portion.

17. The drinking container of claim 15, wherein each of said plurality of ribs extend from a peripheral portion of said first diaphragm member to said central hub portion.

* * * * *